(12) United States Patent
Keable

(10) Patent No.: US 11,875,445 B2
(45) Date of Patent: Jan. 16, 2024

(54) SEAMLESS IMAGE PROCESSING OF A TILED IMAGE REGION

(71) Applicant: Electronic Arts, Inc., Redwood City, CA (US)

(72) Inventor: Julien Keable, Montreal (CA)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 17/450,665

(22) Filed: Oct. 12, 2021

(65) Prior Publication Data

US 2023/0114325 A1    Apr. 13, 2023

(51) Int. Cl.
| | |
|---|---|
| *G06T 15/04* | (2011.01) |
| *G06T 15/00* | (2011.01) |
| *G06T 3/40* | (2006.01) |
| *A63F 13/52* | (2014.01) |
| *G06T 1/60* | (2006.01) |

(52) U.S. Cl.
CPC .............. *G06T 15/04* (2013.01); *A63F 13/52* (2014.09); *G06T 1/60* (2013.01); *G06T 3/40* (2013.01); *G06T 15/005* (2013.01)

(58) Field of Classification Search
CPC .................................. G06T 15/04; G06T 3/40
See application file for complete search history.

(56) References Cited

U.S. PATENT DOCUMENTS

| | | | | |
|---|---|---|---|---|
| 2015/0287166 A1* | 10/2015 | Cerny | ..................... | G06T 17/20 345/423 |
| 2017/0316601 A1* | 11/2017 | Kakarlapudi | ........... | G06T 15/04 |
| 2017/0358122 A1* | 12/2017 | Cwik | ...................... | G06T 15/04 |
| 2018/0082467 A1* | 3/2018 | Andersson | ............ | G06T 15/405 |

* cited by examiner

*Primary Examiner* — Samantha (Yuehan) Wang
(74) *Attorney, Agent, or Firm* — Knobbe, Martens, Olson & Bear LLP

(57) ABSTRACT

Systems and methods for performing a processing operation for a tiled image region are disclosed. The tiled image region may include a plurality of tiles or images. Further, the tiled image region may correspond to a plurality of image resolutions. A system may execute a game development application to perform the processing operation for the tiled image region. The system may identify the tiled image region corresponding to the processing operation. The system can utilize a texture array, a lookup texture, and a scaling factor to determine position data for the tiled image region. The system can then render a continuous image region that represents the tiled image region. The system can seamlessly process the continuous image region according to the processing operation and use the continuous image region to update the tiled image region.

20 Claims, 6 Drawing Sheets

SEAMLESS IMAGE PROCESSING OF A TILED IMAGE REGION

BACKGROUND

Field

Some embodiments of the present disclosure are directed to systems and methods for developing electronic games for a gaming system and enhancing game development tools.

Description

Video games have increased in popularity and complexity in recent years. As the popularity and complexity of video games has increased, many players desire the terrain associated with the video game to be of an increased quality and exhibit additional capabilities. This is particularly true in open world video games, where the terrain shown to a player may illustrate a large, open-world area. In order to mimic a lifelike experience, the terrain may include variable resolution images such that content near a particular area is shown at a higher image resolution and content further from a particular area is shown at a lower image resolution. The use of variable resolution images can cause difficulties when editing the terrain. For example, a game developer may experience delays and/or difficulties when editing a terrain (e.g., adding a fixed value to image data) that includes variable resolution images.

SUMMARY OF EMBODIMENTS

The systems, methods, and devices of this disclosure each have several innovative aspects, no single one of which is solely responsible for the all of the desirable attributes disclosed herein.

One embodiment discloses a system. The system can include one or more processors and a computer-readable storage medium including machine-readable instructions that, when executed by the one or more processors, may cause the one or more processors to execute a game development application for generating terrain data for a terrain. The terrain may include an image divided into a plurality of tiles. The game development application may receive input identifying a tiled image region of the image within a user interface of the development application. The tiled image region may include at least a portion of the plurality of tiles. The at least a portion of the plurality of tiles may be configured for display based on image data of the image. The game development application may generate a texture array. Further, the game development application may generate a lookup texture. The lookup texture may identify a corresponding tile index in the texture array of each tile of the at least a portion of the plurality of tiles within the tiled image region. Further, the game development application may render, using the lookup texture and the texture array, a continuous image region including a plurality of pixels. Each pixel of the plurality of pixels may correspond to a respective position within a respective tile of the at least a portion of the plurality of tiles. The respective position may be identified using the lookup texture. Further, the game development application may process the continuous image region based on a processing operation to generate a processed continuous image region. Further, the game development application may update the tiled image region of the terrain for display within the game development application with the processed continuous image region.

In various embodiments, the processing operation may include a request to add image data to the image data of the image, delete image data from the image data of the image, or modify image data of the image data of the image.

In various embodiments, the game development application may obtain a request to update the tiled image region based on the processing operation.

In various embodiments, the game development application may identify the terrain. Further, the game development application may obtain input. The input may include the processing operation and the tiled image region of the image. Further, the game development application may receive the input identifying the tiled image region of the image by identifying the tiled image region of the image based on the input.

In various embodiments, the lookup texture may identify one or more image resolutions associated with the at least a portion of the plurality of tiles.

In various embodiments, the game development application may identify a scaling factor. The scaling factor may identify a texture position within a particular tile of the at least a portion of the plurality of tiles for each pixel of the plurality of pixels. The respective position may further be identified using the scaling factor.

In various embodiments, the one or more processors may include one or more graphical processing unit processors.

In various embodiments, the tiled image region may be associated with a plurality of image resolutions. Further, the continuous image region may be associated with a uniform image resolution.

In various embodiments, the game development application may upsample one or more tiles of the at least a portion of the plurality of tiles prior to rendering the continuous image region. Further, the game development application may downsample a portion of the continuous image region. The portion of the continuous image region may correspond to the one or more tiles.

In various embodiments, the at least a portion of the plurality of tiles are aligned with a quadtree layout, wherein the quadtree layout is specified by a user.

In various embodiments, the terrain may include a plurality of images. Each of the plurality of images may be divided into a corresponding plurality of tiles. The plurality of images may include the image.

In various embodiments, the system may include memory. The memory may store the texture array and the lookup texture.

In various embodiments, the image data may include raster data.

In various embodiments, the one or more processors may include one or more graphical processing unit processors. Further, the game development application may obtain the image from one or more central processing unit processors.

In various embodiments, the texture array may be associated with a plurality of uv coordinates. The plurality of uv coordinates may identify a respective position of each tile of the at least a portion of the plurality of tiles in the tiled image region. Further, to identify the respective position, the game development application may determine uv coordinates for each tile of the at least a portion of the plurality of tiles in the tiled image region.

Another embodiment discloses a computer-implemented method as implemented by an interactive computing system configured with specific computer-executable instructions during runtime of a game development application for generating terrain data of a terrain. The terrain may include an image divided into a plurality of tiles. The method may include receiving input identifying a tiled image region of the image within a user interface of the development application. The tiled image region may include at least a portion of the plurality of tiles. The at least a portion of the plurality of tiles may be configured for display based on image data of the image. The method may further include generating a texture array. Further, the method may include generating a lookup texture. The lookup texture may identify a corresponding tile index in the texture array of each tile of the at least a portion of the plurality of tiles within the tiled image region. Further, the method may include rendering, using the lookup texture and the texture array, a continuous image region. The continuous image region may include a plurality of pixels. Each pixel of the plurality of pixels may correspond to a respective position within a respective tile of the at least a portion of the plurality of tiles. The respective position may be identified using the lookup texture. Further, the method may include processing the continuous image region based on a processing operation to generate a processed continuous image region. Further, the method may include updating the tiled image region of the terrain for display within the game development application with the processed continuous image region.

In various embodiments, the method may include identifying the terrain. Further, the method may include obtaining input. The input may include the processing operation and the tiled image region of the image. The method may further include receiving the input identifying the tiled image region of the image by identifying the tiled image region of the image based on the input.

In various embodiments, the method may include upsampling one or more tiles of the at least a portion of the plurality of tiles prior to rendering the continuous image region. Further, the method may include downsampling a portion of the continuous image region. The portion of the continuous image region may correspond to the one or more tiles.

Another embodiment discloses a non-transitory computer-readable medium storing computer-executable instructions that, when executed by one or more computing devices, may configure the one or more computing devices to execute a game development application for generating terrain data of a terrain. The terrain may include an image divided into a plurality of tiles. The game development application may receive input identifying a tiled image region of the image within a user interface of the development application. The tiled image region may include at least a portion of the plurality of tiles. Further, the game development application may generate a texture array. Further, the game development application may generate a lookup texture. The lookup texture may identify a corresponding tile index in the texture array of each tile of the at least a portion of the plurality of tiles within the tiled image region. Further, the game development application may render, using the lookup texture and the texture array, a continuous image region. The continuous image region may include a plurality of pixels. Each pixel of the plurality of pixels may correspond to a respective position within a respective tile of the at least a portion of the plurality of tiles. The respective position may be identified using the lookup texture. Further, the game development application may process the continuous image region based on a processing operation to generate a processed continuous image region. Further, the game development application may update the tiled image region of the terrain for display within the game development application with the processed continuous image region.

In various embodiments, the game development application may further upsample one or more tiles of the at least a portion of the plurality of tiles prior to rendering the continuous image region. Further, the game development application may downsample a portion of the continuous image region. The portion of the continuous image region may correspond to the one or more tiles.

Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Figure 1:
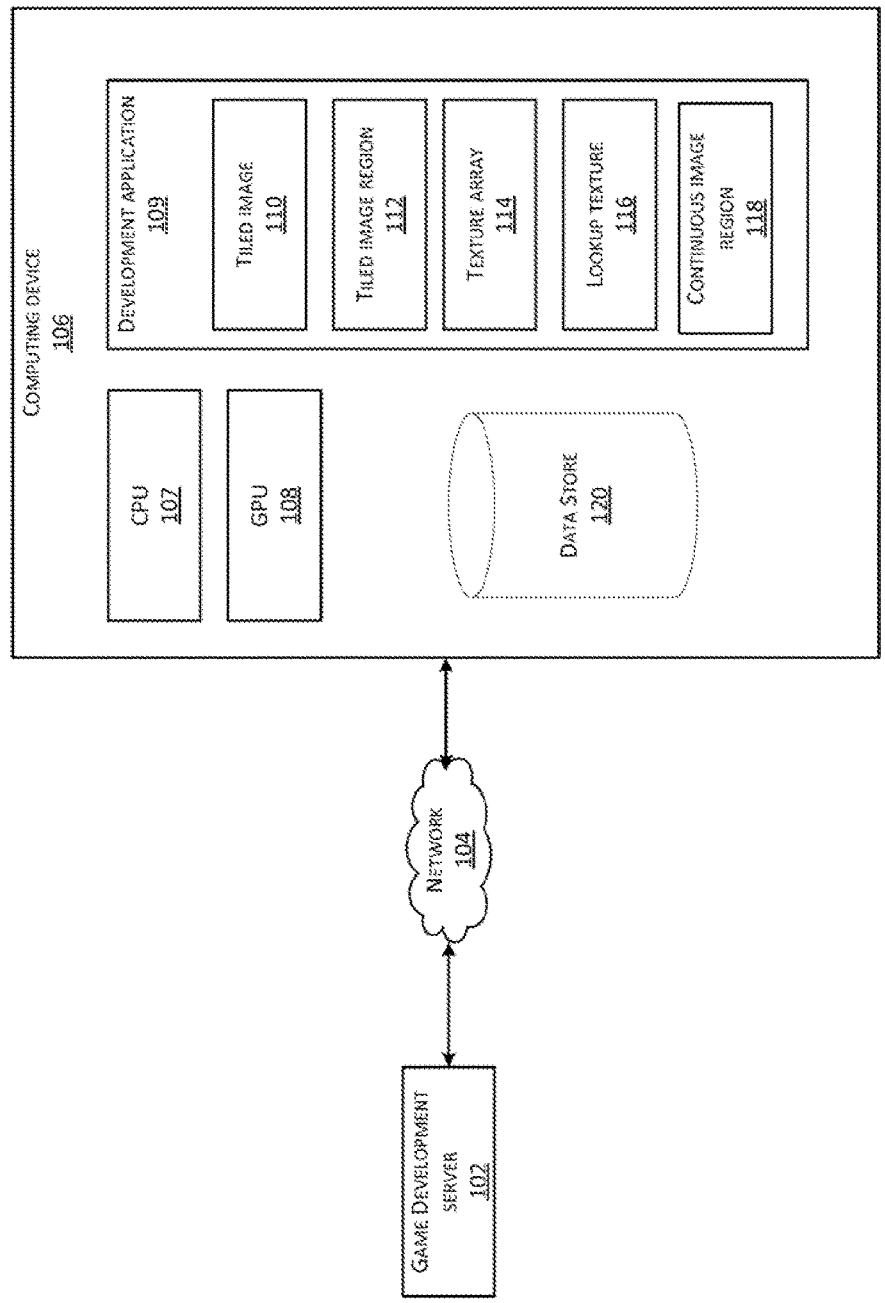
FIG. 1 illustrates an embodiment of a networked computing environment that can implement one or more processing operations.

DETAILED DESCRIPTION OF EMBODIMENTS 1.0 General Overview

Some embodiments herein are directed to an improved game development system for facilitating a game developer's interactions while updating and/or developing an electronic game in order to improve the efficiency and quality of the game development process while also improving the experience of the game developer. The electronic game described herein is an example of a game, such as a game in which one or more players utilize respective computing devices to control virtual game characters within a game world (e.g., an open game world) of the game. In some embodiments, the electronic game can be a mobile game, such as a mobile game that is implemented on a mobile computing device (e.g., a tablet, a cell phone, wearable electronics, etc.). Therefore, electronic games can be implemented on multiple computing devices and players can utilize respective computing devices in order to control virtual game characters (referred to herein as characters) and implement the game. The virtual game characters may be implemented within a virtual game world of a game application.

Developing electronic games can be complex and time-consuming. Part of developing electronic games includes developing the game world within which the virtual game characters exist and/or interact. Further, developing the electronic games may include developing the images that are illustrated by the computing devices of the players. In order to develop the electronic games, a developer, via the computing device of the developer, may request modification or processing of images represented within the game world. This modification or processing can occur during development processes and during any stage of development of the electronic game. In some cases, the developer may request a preview of a modification or processing of the image data.

Modern electronic games have increased dramatically in size compared to electronic games of the past. Further, the size of electronic games continues to increase. For instance, many massively multiplayer online role-playing games (MMORPGs) correspond to hundreds of square miles in the real world. MMORPGs are not the only types of games that use large game worlds, but regardless of the type of game, game worlds have increased over time. In many cases, the increase in the size of the game world has outpaced the central processing power and/or graphics processing power of many video game and computing systems.

Further, as video games have increased dramatically in size, the image quality required by players has also increased. For example, many players desire an electronic game that enables a lifelike experience closely mimicking the real world. For instance, virtual reality games are one example of electronic games that are developed to closely mimic the real world. As the demand for such an experience has increased, the image quality requirements has also increased. In order to increase the image quality of the game world, developers may split the game world into a tiled image region. Further, the game world can include a tiled image region with variable image resolution. Such a tiled image region with variable image resolution may be necessary to increase the quality of the game world. The tiled image region can be an image region that is divided into a plurality of tiles which collectively represent an image. For example, an image region may be tiled based on a quadtree representation or layout (e.g., a tree-based spatial data structure in which each node can be split into four children). Further, the partitioning or segmenting of the image region can be used to generate a layout of fixed tiles based on a node depth of the tree. Each tile can further be stored in a separate image (e.g., a sub-image). This can enable the developers to define a game world that illustrates content in a particular area with a higher image resolution and content in another area with a lower image resolution. For example, content closer to a virtual game character can be illustrated with a higher image resolution and content further from a virtual game character can be illustrated with a lower image resolution. This can enable the game world to mimic the real world. As the game world includes a tiled image region, processing and/or modifying the game world can be difficult. For example, a developer may desire to modify a particular portion of the game world (e.g., add a fixed value to the image data, compute soil erosion, etc.), and, in order to modify the particular portion of the game world, the developer may be required to separately implement processing jobs for each tile of the tiled image region as each tile corresponds to a separate image or separate sub-image. For example, the system may sub-divide the processing job into multiple sub-processing jobs that each cover at most a single tile of the tiled image region. Further, the system may, as part of performing the processing job, determine which tile corresponds to each portion of the processing job. This process may be inefficient and/or costly as it may create additional update operations and/or require further processing operations to be performed downstream. For example, each individual sub-processing job may be associated with a fixed performance cost. Further, dividing the processing job into multiple sub-processing jobs that at most cover one tile of the tiled image region may be inefficient and cause over-segmentation as the image resolution may be constant across one or more tiles. For example, the modified portion of the game world may correspond to a plurality of tiles with the same image resolution. Further, determining modified tiles while performing the processing job may also be inefficient where multiple pixels of the tiled image region are to be used to process a single pixel (e.g., when implementing a blur filter).

The present disclosure generally relates to a system for implementing a game development application that allows for more efficient modification or processing of image data associated with an electronic game.

In order to modify developer game data, developer computing devices (e.g., designer computing devices) may be in communication with a local or remote data store. For example, the developer computing devices can modify the developer game data to modify how the game is implemented. The developer computing devices can generate one or more service calls that modify the developer game data within the database. For example, the developer computing device can modify, add, or delete developer game data from the database (e.g., add, remove, modify tiled image data, or otherwise modify the game application information). The developer computing devices can interact with the database to modify the developer game data. Based on the modified developer game data, the developer game data read by the game server may be adjusted. Therefore, the developer computing devices can adjust the game that is implemented by the computing devices.

Typically, such developer computing devices may provide input that defines how a given tiled image region is to be modified. Further, existing gaming systems may receive the input and process a particular image based on a processing operation defined by the input (e.g., a filter, a modification, etc.). Existing gaming systems may rely on an iterative approach to apply the processing operation to the particular image. This can result in an unwieldy and exhaustive process as each tile or image of the tiled image region may be processed separately. The segmented (e.g., tiled, fragmented, etc.) nature of the tiled image region may cause the existing gaming systems to run a series of iterative operations for each tile. For example, while traditional development systems may process a given image or tile, each image or tile may be processed separately based on a separate processing operation. Therefore, it may be disadvantageous to sub-divide the processing job into multiple sub-processing jobs that each covers at most a single tile. Additionally, it may also be disadvantageous to process the tiled image region in a single pass by offsetting the identification of the tiles downstream as multiple pixels may need to be read in order to perform the processing operation.

The disclosed game development system addresses these challenges, among others, by enabling a seamless processing of a tiled image region. Further, the system utilizes a lookup texture and a texture array in order to store position information about each tile of the tiled image region. In some embodiments, the system may also utilize a scaling factor to store additional position information about each tile of the tiled image region. The additional position information may identify a position within a particular texture of the texture array identified by the tile index of the lookup texture. Therefore, the lookup texture and the scaling factor may identify a particular position within a texture of the texture array. Further, the system can render a continuous image region based on the tiled image region. The continuous image region may be upsampled to match a highest image resolution of the tiled image region. Further, the system can perform the processing operation on the continuous image region. As the continuous image region corresponds to single image (e.g., the continuous image region is not tiled), the processing can be seamless and performed in a single pass. Further, the tiled image region may be updated with the processed continuous image region. In some embodiments, the processed continuous image region may be downsampled prior to updating the tiled image region in order to match the multiple image resolutions of the tiled image region.

For purposes of this disclosure, the term "player," "user," and "customer" may each refer to a person that is operating a computing device in order to control the operation of a game application. For purpose of this disclosure, the term "character" can refer to a virtual avatar or character that a user can control within a game application. The character can be a person, vehicle, object, and/or any entity that the user can control within the game application.

2.0 Overview of Video Game Environment

FIG. 1 illustrates an embodiment of a computing environment 100 for implementing an image processing system on a computing device 106. The environment 100 includes a network 104, a game development server 102, and a computing device 106, which includes a graphical processing unit ("GPU") 108 that includes an image (e.g., the tiled image 110), a tiled image region 112, a texture array 114, a lookup texture 116, and a continuous image region 118. To simplify discussion and not to limit the present disclosure, FIG. 1 illustrates only one computing device 106 and one game server 102, though multiple systems may be used. The computing device 106 may communicate via a network 104 with the game server 102. Although only one network 104 is illustrated, multiple distinct and/or distributed networks 104 may exist. Although not shown in FIG. 1, it will be understood that the computing environment 100 may include more, less, or different components.

2.1 Network

As illustrated in FIG. 1, the computing device 106 and the game server 102 may communicate over the network 104. The network 104 can include any type of communication network. For example, the network 104 can include one or more of a wide area network (WAN), a local area network (LAN), a cellular network, an ad hoc network, a satellite network, a wired network, a wireless network, and so forth. In some embodiments, the network 104 can include the Internet. In the illustrated embodiment, the network 104 is the Internet. Protocols and components for communicating via the Internet or any of the other aforementioned types of communication networks are known to those skilled in the art of computer communications and thus, need not be described in more detail herein.

2.2 Game Development Server

The developer computing device 106 may be in communication with a game development server 102. The game development server 102 can be configured to host game development resources for use by developers in the game development process. For example, the game development server(s) 102 may be configured to include one or more application host systems and a data store. The game development server 102 may enable multiple users or computing systems to access a portion of game development resources for the game application.

2.3 Data Store

The data store 120 may be a collection of data (e.g., game data, game state data, and/or developer game data associated with the game). For example, the data store 120 can store developer game data and/or player game data corresponding to development and execution of a game application. The developer computing devices can modify the developer game data and/or the player game data stored in the data store 120 and based on the modified developer game data and/or player game data, the game server 102 may adjust how the game is run.

The data store 120 can store game data (e.g., developer game data and player game data) including game rules, poses/paths, environmental settings, environmental objects, constraints, skeleton models, route information, and/or other game application information. At least a portion of the game data can be stored in the data store 120. In some embodiments, a portion of the game data may be received and/or stored remotely. Further, at least a portion of the game data may be received during runtime of the game application.

The data store 120 can further store game state data including a game state, character states, environment states, scene object storage, route information, and/or other information associated with a runtime state of the game application. For example, the game state data can identify the state of the game application at a specific point in time, such as a character position, character operation, character action, game level attributes, and other information contributing to a state of the game application. The game state data can include dynamic state data that continually changes, such as character movement positions, and/or static state data, such as the identification of a game level within the game.

2.4 Developer Computing Device

The developer computing device 106 may execute a development application in order to execute game development functions associated with development of a game application. For example, the game development application may provide functions for processing game data for the virtual game environment. The user computing system may include hardware and software components for establishing communications over communication network (e.g., the network 104). For example, the user systems may be equipped with networking equipment and network software applications (for example, a web browser) that facilitate communications via one or more networks (for example, the Internet or an intranet). The user computing system may have varied local computing resources such as central processing units (CPU) 107 and architectures, memory, mass storage, graphics processing units (GPU) 108, communication network availability and bandwidth, and so forth. Further, the user computing system may include any type of computing system. For example, the user computing system may include any type of computing device(s), such as desktops, laptops, video game platforms, television set-top boxes, televisions (for example, Internet TVs), network-enabled kiosks, car-console devices computerized appliances, wearable devices (for example, smart watches and glasses with computing functionality), and wireless mobile devices (for example, smart phones, PDAs, tablets, or the like), to name a few.

The developer computing device 106 may implement the game development application 109 in order to enable a developer to manage the game by performing processing operations on the game data for the game. For example, the developer computing device may implement the game development application in order to modify how a virtual environment is represented to a user (e.g., by applying filters, brushes, etc.) The developer computing device may include one or more input devices that are configured to receive developer input. For example, the developer can interact with the input devices of the developer computing device (e.g., a touch sensor, a mouse, a keypad, etc.) in order to generate input for a game development application being implemented by the developer computing device. The developer computing device may detect the user input as a movement with respect to the developer computing device that can include a spatial component, a directional component, an intensity component, or any other magnitude or component. The user input may be detected relative to a first space (e.g., a screen space). For example, the component information of the user input may be relative to the screen space of the developer computing device.

Typically, the developer computing system is capable of executing a game application, such as a video game, that may be stored and/or executed in a distributed environment. For example, the user computing system may execute a portion of a game and the interactive computing system, or an application host system of the interactive computing system, may execute another portion of the game. For instance, the game may be a massively multiplayer online role-playing game (MMORPG) that includes a client portion executed by the user computing system and a server portion executed by one or more application host systems. For the present discussion, the application can include a distributed application or an application that includes a portion that executes on the user computing system and a portion that executes on at least one of the application host systems. The user computing system may execute a host application. The host application can be loaded into memory on the user computing system and can act as an interface or hub for one or more game applications that interfaces with the application host system.

As used herein, a virtual environment may comprise a simulated space (e.g., a physical space) instanced on a server (e.g., server) that is accessible by a client (e.g., client) located remotely from the server, to format a view of the virtual environment for display to a user of the client. The simulated space may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual environment, and/or surface features of a surface or objects that are "native" to the virtual environment. In some implementations, the topography may describe a surface (e.g., a ground surface) that runs through at least a substantial portion of the virtual environment. In some implementations, the topography may describe a volume with one or more bodies positioned therein (e.g., a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

2.5 Processing Game Data

The development application 109 can utilize the GPU 108 to process game data using various functions within the application. For example, the development application 109 may process game data based on one or more requests received from developer computing devices. Further, the one or more requests may include a request to apply a filter, a function, or otherwise modify or process the game data. In order to process the game data, the GPU 108 can utilize a tiled image 110, a tiled image region 112, a texture array 114, a lookup texture 116, and/or a continuous image region 118. The development application 109 can implement a process whereby the GPU can seamlessly process an arbitrary region of the tiled image 110.

2.5.1 Image

The GPU 108 can receive game data that may include one or more images (e.g., one or more tiled images 110). The GPU 108 may receive an identification of the one or more tiled images 110 from the game server 102. Further, the one or more tiled images 110 may be based on or more requests from a developer computing device. The GPU 108 may also identify a processing operation to be performed on a portion of the one or more tiled images 110. For example, the developer computing device may interact with the development application 109 to identify a portion of the one or more tiled images 110 and a processing operation to be performed at or on the portion of the one or more tiled images 110.

2.5.2 Tiled Image Region

The one or more tiled images 110 may include a plurality of tiles. For example, the tiled image may be a quadtree-based, variable resolution image raster. The one or more tiled images 110 may be partitioned using a tree-based spatial data structure. Further, a tiled image 110 may be partitioned within a two-dimensional space. The tiled image 110 can further include a layout of tiles which collectively represent the tiled image 110. In some embodiments, the image resolution of the tiled image 110 may vary across the tiles. For example, a first tile of the tiled image 110 may correspond to a first image resolution and a second tile may correspond to a second image resolution. In other embodiments, the tiled image 110 and/or the tiled image region 112 may have a uniform image resolution. Therefore, the portion of the tiled image 110 identified within the developer application may correspond to a tiled image region 112. Further, the tiled image region 112 may correspond to portions of multiple tiles of the tiled image 110. For example, the tiled image region 112 may include a portion of a first tile, a portion of a second tile, a portion of a third tile, a portion of a fourth tile, etc.

2.5.3 Texture Array

The development application may create a texture array 114 within the GPU 108. The texture array 114 may be a common array located and/or stored in GPU memory. The texture array 114 may be a two-dimensional array containing parameters of tiles corresponding to a particular portion of the tiled image 110. Further, the computing device 106 may identify the tiles of the tiled image 110 that correspond to the tiled image region 112. The computing device 106 can identify the tiles and/or the portions of tiles captured by the tiled image region 112. The computing device 106 may then upload the identified tiles and/or portions of tiles to the texture array 114. Each texture of the texture array 114 may correspond to a particular tile of the tiles captured by the tiled image region 112. The texture array 114 may identify tiles that are intersected by the tiled image region 112.

2.5.4 Lookup Texture

The development application 109 may further create the lookup texture 116 (e.g., a lookup table) within the GPU 108. The computing device 106 may write information about the tiled image region 112 and/or the texture array 114 to the lookup texture 116. The development application 109 may write, to the lookup texture 116, texture information about a corresponding texture array. For example, the development application 109 may write, to the lookup texture 116, a tile index (e.g., a texture array index) in the texture array 114 for each tile of the plurality of tiles within the tiled image region 112. Further, the development application 109 can write a tile index for each tile of the plurality of tiles within the tiled image region 112. For example, the lookup texture 116 may be a pointer or an indirection texture. The tile index may identify a position of each texture in the texture array 114 based on the tile index. In some embodiments, the development application 109 may also write a highest image resolution for the tiled image region 112 to the lookup texture 116. For example, the development application 109 may parse and/or examine the tiled image region 112 to identify the image resolution of each tile within the tiled image region 112. Further, the development application 109 can identify a highest image resolution (e.g., greatest pixels per inch (ppi), etc.) from the tiled image region 112.

In some embodiments, the development application 109 may further create and store a scaling factor. The scaling factor may include a scale in a first dimension, a scale in a second dimension, an offset in a first dimension, and an offset in a second dimension. The development application 109 may utilize the scaling factor to convert positions of pixels within a continuous image region to positions within a particular tile or texture of the tiled image region (as stored by the texture array) and positions within the tiled image region to positions of pixels within the continuous image region. For example, the development application 109 may utilize the scaling factor in order to convert a world coordinate into a u, v coordinate within a given texture of the texture array. The development application 109 may utilize the lookup texture 116 to determine which texture of the texture array 114 corresponds to a given pixel and the scaling factor to determine a position of a given pixel with the corresponding texture. The development application 109 may then sample the data from the tiled image region 112. In some embodiments, the computing device 106 may upsample the tiled image region by inserting additional pixels with the pixels sampled from the tiled image region 112 in order to generate a continuous image region 118 with a uniform image resolution. Further, the development application 109 may automatically upsample the tiled image region 112 in generating the continuous image region 118 to match a highest image resolution of the tiled image region 112.

2.5.5 Continuous Image Region

The development application 109 may utilize the lookup texture 116 and/or the texture array 114 in order to generate a continuous image region 118 from the tiled image region 112. The development application 109 may render, using the lookup texture and the texture array, a continuous image region 118 comprising a plurality of pixels. Each pixel of the plurality of pixels may correspond to a respective position within a respective tile of the plurality of tiles of the tiled image region 112. The respective tile index of each pixel within the plurality of tiles may be identified using the lookup texture 116. Further, the tile indices may be utilized to identify positions of the textures within the texture array 114. In some embodiments, the plurality of tiles of the tiled image region 112 may correspond to multiple image resolutions. Further, in order to generate the continuous image region 118, the development application 109 may upsample the tiles of the tiled image region 112. The development application 109 may upsample the tiles by adding an average value of all sequential pixel pairs on a particular dimension and repeating the process for another dimension. The upsampling of the tiles may enable the development application 109 to generate the continuous image region that shares a highest image resolution. The upsampling process may be a non-destructive process in order to enable the plurality of tiles to be subsequently downsampled from the continuous image region 118 in order to recapture the plurality of image resolutions.

The development application 109 can apply GPU-based filters to the continuous image region 118 in order to process the continuous image region 118. Based on applying the GPU-based filters, the development application 109, via the GPU 108, can generate a processed continuous image region. The processed continuous image region may correspond to an output of the GPU 108. The development application 109 can then copy data from the processed continuous image region for output as the tiled image 110 (e.g., as a portion of the tiled image 110) for a user (e.g., a developer). For example, the development application 109 may copy the data from the processed continuous image region to the portion of the tiled image 110 corresponding to the tiled image region 112. In some embodiments, the tiled image 110 may correspond to multiple image resolutions. Further, portions of the processed continuous image region may be downsampled in order to match the multiple image resolutions of the tiled image 110. The development application 109 can utilize the lookup texture 116 and/or the texture array 114 to determine how to downsample the tiled image 110. For example, where the portion of the tiled image 110 includes a first tile with a first image resolution, a second tile with a second image resolution, and a third tile with a third image resolution and the processed continuous image region has a third image region, a first portion of the processed continuous image region corresponding to the first tile may be downsampled to match the first image resolution and a second portion of the processed continuous image region corresponding to the second tile may be downsampled to match the second image resolution. The development application 109 may downsample the processed continuous image region by removing even pixels in both x and y dimensions or the u and v dimensions. Therefore, the processed continuous image region may be utilized to output an image corresponding to the portion of the tiled image 110.

3.0 Overview of the Tiled Image Region

In order to define a particular region of the image (e.g., a tiled image region) to be processed by the computing device, the developer computing device 106 can provide an indication of the tiled image region. Further, the developer computing device 106 can provide a processing operation to be performed on provided and/or identified tiled image region. Aspects relate to identifying a particular tiled image region that corresponds to multiple tiles. A user input may be received and translated into a particular tiled image region and a particular processing operation. For example, a user generated swipe may be translated into a tiled image region corresponding to the user generated swipe and a filter to be applied to the tiled image region. Based on the user input, the tiled image region can be identified and obtained for processing. Accordingly, the system can identify a tiled image region for processing.

Figure 2:
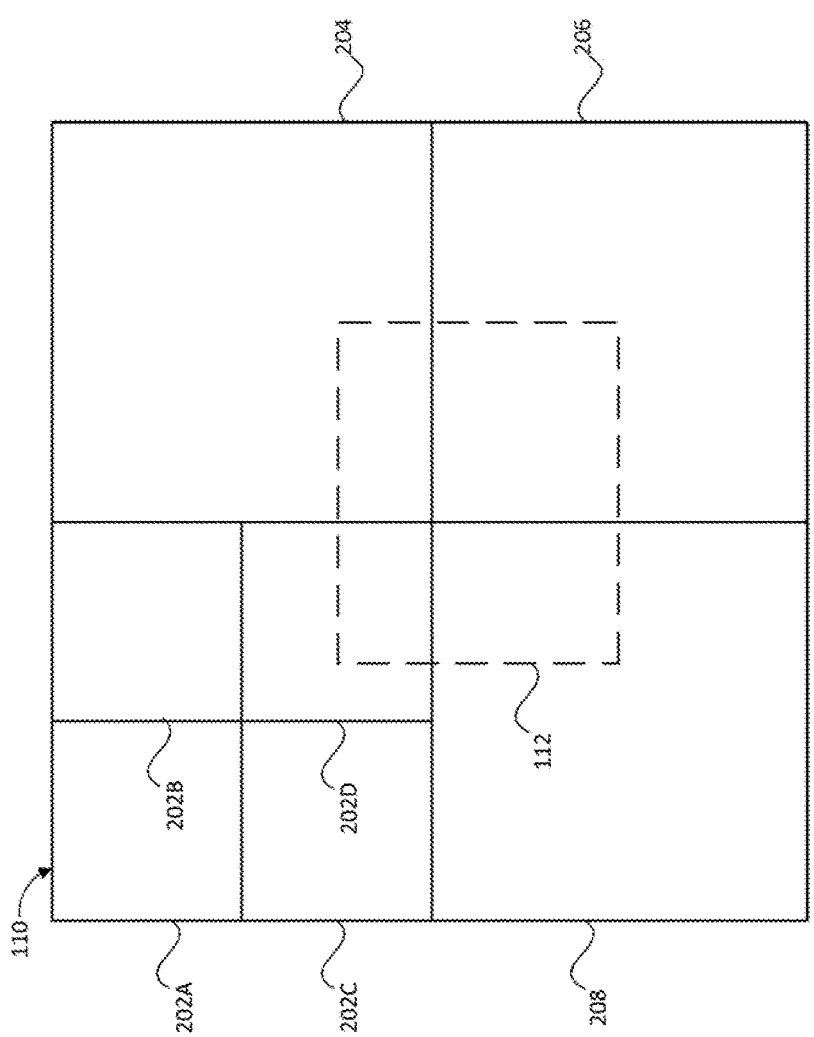
FIG. 2 is a pictorial diagram depicting a tiled image region.

FIG. 2 is a pictorial diagram 200 depicting a tiled image 110 and a tiled image region 112 according to some embodiments herein. The diagram 200 may depict a tiled image region corresponding to one or more images (e.g., a terrain image) for display within a virtual environment (e.g., a game environment) of a game application. Further, the diagram 200 may depict how a user input is received and translated into the tiled image region. Based on the user input, the tiled image region for processing can be identified and the processing operation to be applied may also be identified.

The tiled image region 112 may be identified by and/or obtained from a developer computing device. Further, the tiled image region 112 may be identified within an image (e.g., the tiled image region 112 may be a subset or portion of the image). The developer computing device may detect the user input as a movement with respect to the developer computing device that can include a spatial component, a directional component, an intensity component, or any other magnitude or component. The user input may be detected relative to a first space (e.g., a screen space). For example, the component information of the user input may be relative to the screen space of the developer computing device. The developer computing device may translate the user input into an action to be performed on a particular portion of the image (e.g., the tiled image region 112) based on the user input.

The tiled image 110 may include a plurality of tiles that collectively represent the tiled image 110. Each tile of the plurality of tiles may be represented as an individual tile (e.g., a sub-image) with a corresponding image resolution. The image may include a plurality of tiles with a plurality of image resolutions in order to provide higher detail density in the areas that will be viewed from a closer point of view (e.g., to generate a more lifelike experience). The tiled image may represent a particular virtual environment (e.g., a particular representation of the virtual environment). For example, the tiled image 110 may represent a terrain within the game world. Further, the tiled image 110 may be a single image of the terrain within the game world and may define data for locations on the terrains within the game world. The use of a plurality of image resolutions may enable the game server to generate a virtual environment that represents portion of the virtual environment with different image resolutions.

The tiled image 110 may include a plurality of tiles. For example, the plurality of tiles may be distributed based on a quadtree representation of the image. It will be understood that the image may be represented using a distribution. The tiled image 110 illustratively includes a first tile 202A, a second tile 202B, a third tile 202C, a fourth tile 202D, a fifth tile 204, a sixth tile 206, and a seventh tile 208. It will be understood that the tiled image 110 may include more, less, or different tiles. In the example of FIG. 2, the first tile 202A, the second tile 202B, the third tile 202C, and the fourth tile 202D may correspond to (e.g., exhibit, be associated with, be linked to, be displayed in the virtual environment, etc.) a first image resolution. Further, the fifth tile 204, the sixth tile 206, and the seventh tile 208 may correspond to a second image resolution. The second image resolution may be a higher image resolution as compared to the first image resolution.

The tiled image region 112 may be identified within the tiled image 110 based on input (e.g., user input from a developer computing device). The tiled image region 112 may correspond to a portion of the plurality of tiles of the image. In the example of FIG. 2, the tiled image region 112 corresponds to a portion of the fourth tile 202D, a portion of the fifth tile 204, a portion of the sixth tile 206, and a portion of the seventh tile 208. Therefore, the tiled image region 112 may correspond to the first image resolution and the second image resolution. In some embodiments, the tiled image region 112 may correspond to more, less, or different image resolutions. In other embodiments, the tiled image region 112 may correspond to a singular image resolution (e.g., the first image resolution). For example, each of the tiles located within the tiled image region 112 may correspond to the same image resolution. Therefore, the tiled image region 112 may be identified from the tiled image 110 for processing based on a defined processing operation.

4.0 Processing a Tiled Image Region

In order to seamlessly perform a processing operation on the tiled image region 112 defined (e.g., by user input), a GPU of a computing device can receive an indication of the tiled image region 112 and an indication of the processing operation to be performed. In order to perform the processing operation, the GPU can generate a lookup texture 116 and a texture array 114 from the tiled image region 112. Further, the GPU can utilize the lookup texture 116 and the texture array 114 to process the tiled image region and generate a continuous image region. By generating a continuous image region 118 corresponding to the tiled image region 112, the GPU can perform the processing operation on the continuous image region 118 in a single pass. Further, the GPU can upload the continuous image region 118 to be displayed as part of virtual environment. Aspects relate to identifying a tiled image region 112 and generating a lookup texture 116 and a texture array 114 using data from the tiled image region 112. Based on the lookup texture 116 and the texture array 114, the continuous image region 118 can be generated and processed. The system can enable the seamless processing of a tiled image region 112 by utilizing a lookup texture 116 and a texture array 114 to generate a continuous image region 118.

Figure 3:
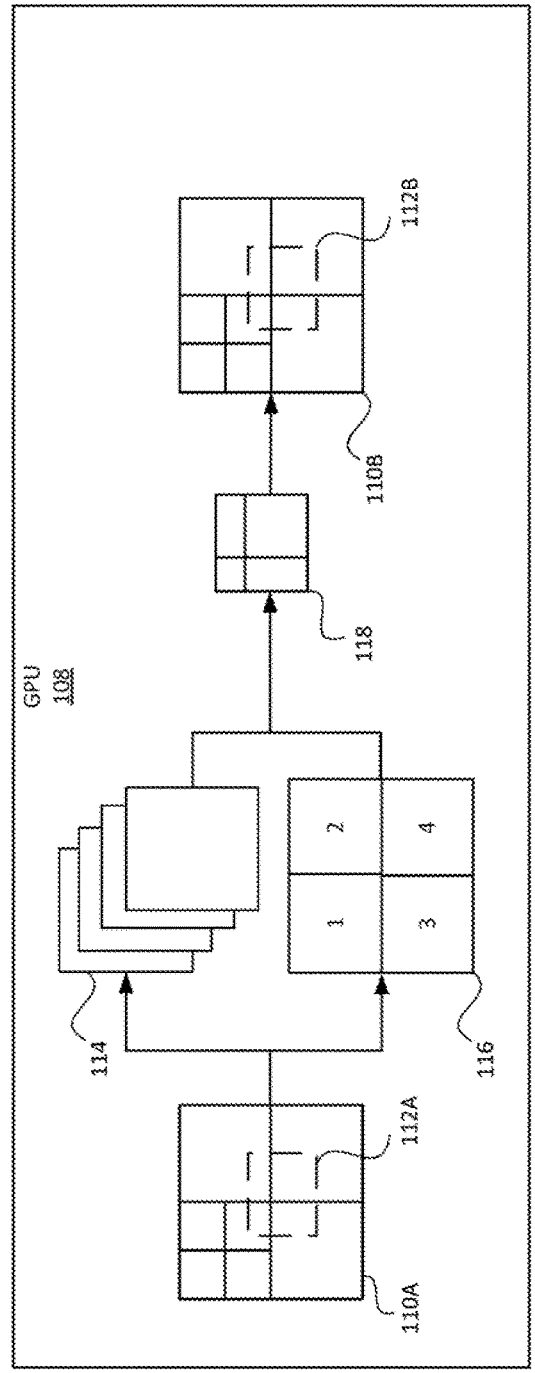
FIG. 3 is a pictorial diagram depicting the processing of a tiled image region.

FIG. 3 is a pictorial diagram 300 depicting the tiled image 110A and a tiled image region 112A within the tiled image 110A according to some embodiments herein. The diagram 300 may depict one or more operations to be performed on the tiled image region 112A in order to upload a continuous image region 118 to an updated tiled image region 112B of an updated tiled image 110B. Further, the diagram 300 may depict how a lookup texture 116 and a texture array 114 are used to generate the continuous image region 118 from the tiled image region 112A. Based on the continuous image region 118, the processing operations can be performed and the updated tiled image 110B may be generated. It will be understood that the processing operation may include more, less, or different operations. In the example of FIG. 3, the process may be performed by a GPU 108 (such as a GPU within a computing device). It will be understood that the process may be executed by any other components.

The GPU 108 may identify a tiled image 110A corresponding to a virtual environment. Further, the tiled image 110A may correspond to a feature of a terrain within the virtual environment. In some embodiments, a terrain may correspond to multiple images (e.g., multiple terrain features). The tiled image 110A may further describe a feature of the terrain. For example, the tiled image 110A may describe a height field, a color map, a mask, etc. associated with the terrain. The tiled image 110A is divided into a plurality of tiles. In some embodiments, the tiled image 110A may be divided into a plurality of tiles based at least in part on a user-specified quadtree layout. For example, a developer, via a developer computing device, may define a particular quadtree layout for a particular image. In some embodiments, the tiled image 110A may describe any terrain characteristic of a terrain. The image can be formed using a drawing, such as a line or circle drawing, where each line can be associated with a graphic property, such as line color, pattern, thickness or other graphic property. Each graphic property is associated with a terrain characteristic (e.g., a height, a geographical feature such as a ridge, a volcano, etc.). For example, the terrain generation system associate different terrain characteristics with different properties. During model training, the terrain characteristics can be associated with the specific graphic properties. The terrain generation system may be configured to associate the terrain characteristics with the properties after the training is complete.

The GPU 108 may identify a tiled image region 112A. The tiled image region 112A may be determined from the tiled image 110A. For example, a developer may select the tiled image region 112A of the tiled image 110A for a particular processing operation. In some embodiments, the tiled image region 112A may correspond to a plurality of tiles. Further, the tiled image region 112A may correspond to a plurality of tiles and a plurality of image resolutions. Therefore, the GPU 108 can identify a tiled image region 112A of the tiled image 110A.

Using the tiled image region 112A, the GPU 108 can generate a texture array 114. The GPU 108 can store a plurality of textures within the texture array 114. Each texture of the texture array 114 may correspond to a particular tile associated with a tiled image region 112A. For example, if the tiled image region 112A corresponds to a portion of a first tile, a portion of a second tile, a portion of a third tile, and a portion of a fourth tile, the texture array 114 may include a first texture that corresponds to the portion of the first tile, a second texture that corresponds to the portion of the second tile, a third texture that corresponds to the portion of the third tile, and a fourth texture that corresponds to the portion of the fourth tile. The texture array 114 may further be associated with a plurality of coordinates (e.g., a plurality of u, v coordinates). Each set of coordinates may identify a position of a particular tile within the tiled image region 112A. For example, a first set of coordinates may identify a position of a first tile (or a portion of a first tile) and a second set of coordinates may identify a position of a second tile (or a portion of a second tile). Further, the texture array 114 can store information identifying the position of each tile of the tiled image region 112A as compared to other tiles of the tiled image region 112A. Therefore, the GPU 108 can utilize the texture array 114 to identify the position of each tile within the tiled image region 112A.

Further using the tiled image region 112A, the GPU 108 can generate a lookup texture 116. The lookup texture 116 may identify the tile index in the texture array 114 of a particular pixel within each tile of the tiled image region 112A. For example, the lookup texture 116 may identify the tile index (e.g., a position) in the texture array 114 of a plurality of pixels within the tiled image region 112A relative to the tiled image region 112A and/or the tiled image 110A. Further, the lookup texture 116 can identify a corresponding tile index in the texture array 114 of each tile of the plurality of tiles within the tiled image region 112A. The lookup texture 116 may store information about each tile of the tiled image region 112A (e.g., tile index information for each pixel associated with a tile of the tiled image region 112A). Therefore, the GPU 108 can use the lookup texture 116 to identify the tile index in the texture array 114 of pixels within a particular tile of the tiled image region 112A.

The GPU 108 can generate, from the tiled image region 112A, a continuous image region 118. The GPU 108 may utilize the texture array 114 and the lookup texture 116 to generate the continuous image region 118. The continuous image region 118 may not be tiled. For example, the GPU 108 may be capable of processing the continuous image region in a single pass as the continuous image region 118 is not tiled and corresponds to a single image. In some embodiments, the continuous image region 118 may correspond to one image resolution. For example, the continuous image region 118 may correspond to a highest image resolution of the tiled image region 112A. In order to generate the continuous image region 118 with one image resolution, the GPU 108 may upsample the tiled image region 112A. The continuous image region 118 may further include a plurality of pixels. Each of the plurality of pixels may be associated with a particular position within the tiled image region 112A. For example, a first pixel within the continuous image region 118 may correspond to a first position within a first tile of the tiled image region 112A. Therefore, the GPU 108 can generate a continuous image region 118 (e.g., a seamless image region, a non-tiled image region, etc.) from the tiled image region 112A using the texture array 114 and the lookup texture 116.

Based on generating the continuous image region 118, the GPU 108 can upload the continuous image region to the tiled image 110A. The GPU 108 may update the tiled image region 112A of the tiled image 110A with the continuous image region 118 in order to generate an updated tiled image region 112B of the tiled image 110B. In some embodiments, in order to generate the updated tiled image region 112B, the GPU 108 can downsample the continuous image region 118 in order to match the image resolution of the tiled image region 112B. As the texture array 114 and the lookup texture 116 store data for the continuous image region 118 and the tiled image region 112A, the GPU 108 can utilize the texture array 114 and the lookup texture 116 to determine how to upload data from the continuous image region 118 to the updated tiled image region 112B. For example, the GPU 108 may determine a position of a pixel of the continuous image region 118 within the tiled image region 112A using the texture array 114 and the lookup texture 116 and update the corresponding position within the tiled image region 112A with the pixel from the continuous image region 118. By generating an updated tiled image 110B that includes an updated tiled image region 112B, the GPU 108 can perform a processing operation on the tiled image region 112A in a single pass.

5.0 Generating a Continuous Image Region for Processing

Figure 4:
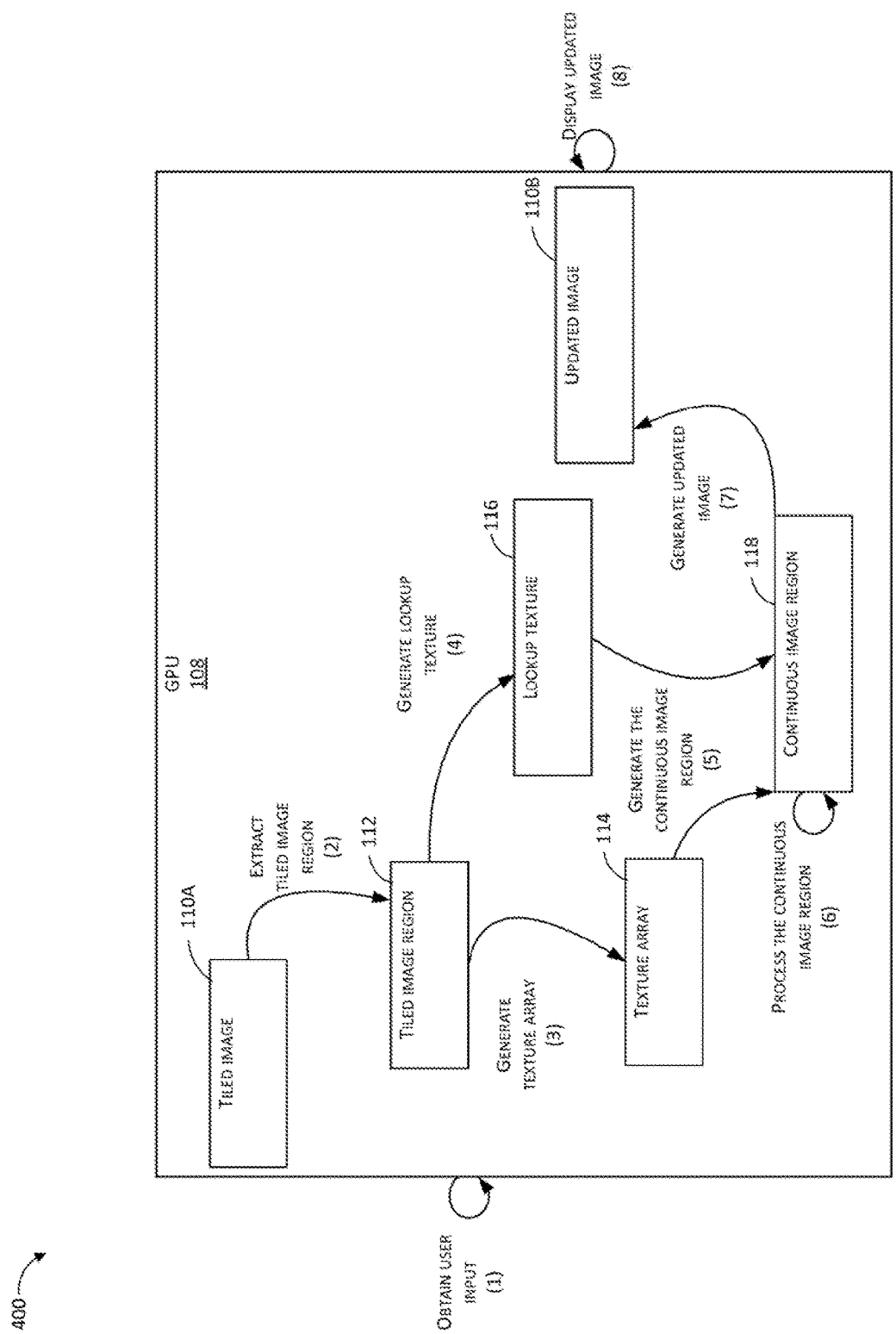
FIG. 4 depicts a schematic diagram of a system including a graphical processing unit for display an updated tiled image region.

FIG. 4 illustrated embodiments of operations 400 by a GPU 108 in order to process a tiled image region according to a processing operation. The operations 400 performed by the GPU 108 may enable the processing of a tiled image region within a single pass and may increase the efficiency of the processing. The GPU 108 may be in communication with a developer computing device in order to provide the results of the processing of the tiled image region.

At (1), the GPU 108 can obtain a user input. The user input may define a particular region of an image or a terrain and a processing operation to be performed on the image or terrain. For example, the user input may identify a height adjustment to be performed within a particular terrain. Further, the user input may identify a blur effect to be applied at a particular location within a particular terrain. It will be understood that the processing operation may include any operation to process and/or modify the image or the terrain.

At (2), the GPU 108 can extract a tiled image region 112 from the tiled image 110A (e.g., a data raster). In some embodiments, the CPU 107 may store the tiled image 110A. In order to generate the texture array 114 and the lookup texture 116, the GPU 108 may obtain the tiled image 110A from the CPU 107. In other embodiments, the GPU 108 may store the tiled image 110A. For example, the GPU 108 may store the tiled image 110 based on a tile budget, a tile priority, the most frequently used tiles, etc. The GPU 108 may utilize the user input in order to determine and/or identify the tiled image region 112 within the tiled image 110. For example, the user input may identify a particular position within the tiled image 110A corresponding to the tiled image region 112. The tiled image 110A and the tiled image region 112 may each correspond to a plurality of tiles. Further, the tiled image region 112 may correspond to a subset of the plurality of tiles of the tiled image 110. The tiled image region 112 may further include portions of tiles from the tiled image 110. In some embodiments, the tiled image region 112 may include any tiles and/or portions of tiles that may be affected and/or modified based on the processing operation. For example, where the processing operation is a blur effect, the tiled image region 112 may correspond to portions of the plurality of tiles where the blur effect may be applied. Each tile of the tiled image region 112 may correspond to a different image or sub-image. The tiled image region 112 may correspond to multiple image resolutions. For example, a first tile of the tiled image region 112 may correspond to a first image resolution and a second tile of the tiled image region 112 may correspond to a second image resolution. The image resolution may identify a number of samples for a given distance (e.g., 2 samples per meter) for a given tile.

At (3), the GPU 108 can generate the texture array 114 based on the tiled image region 112. The GPU 108 may generate the texture array 114 by storing coordinates for each tile that corresponds to the tiled image region 112. For example, if the tiled image region 112 includes a portion of a first tile and a portion of a second tile, the GPU 108 may generate the texture array 114 and store a first set of coordinates in a first texture of the texture array 114 that defines the position of the portion of the first tile within the tiled image region 112 and store a second set of coordinates in a second texture of the texture array 114 that defines the position of the portion of the second tile within the tiled image region 112. Therefore, the GPU 108 can utilize the texture array 114 to determine coordinates of each tile included within the tiled image region 112.

At (4), the GPU 108 can generate the lookup texture 116 based on the tiled image region 112. The GPU 108 may generate a lookup texture 116 by storing tile index data for each tile that corresponds to the tiled image region 112. For example, the GPU 108 may generate the lookup texture 116 and store tile index data within the lookup texture 116 that identifies positions within each tile of the tiled image region 112. Further, the lookup texture 116 may store tile index data identifying the tile index in the texture array 114 of particular pixels within each tile of the tiled image region 112. For example, the tile index data may identify the plurality of pixels that form each tile of the tiled image region 112. Based on the tile index data, the GPU 108 can identify a particular position within a texture of the texture array 114 and corresponding coordinates for a tile of the tiled image region 112.

At (5), the GPU 108 can generate the continuous image region 118 using the texture array 114 and the lookup texture 116. The GPU 108 can construct the continuous image region 118 from the tiled image region 112 using the texture array 114 and the lookup texture 116. The GPU 108 may further utilize the texture array 114 and the lookup texture 116 in order to determine a position of each pixel within the tiled image region 112 and may generate a continuous image region 118 using the position of each pixel within the tiled image region 112. Therefore, the pixels of the continuous image region 118 may be based on the pixels of the tiled image region 112. As the tiled image region 112 includes a plurality of tiles, the tiled image region 112 may correspond to a plurality of individual images each corresponding to a particular tile. Further, the continuous image region 118 may correspond to a single image as the continuous image region 118 is not divided into a plurality of tiles. In some embodiments, in order to generate the continuous image region 118, the GPU 108 may upsample the tiled image region 112 to match a highest image resolution of the tiled image region 112. For example, the GPU 108 may determine that a first tile of the tiled image region 112 is associated with an image resolution of 2 samples per meter and a second tile of the tiled image region 112 is associated with an image resolution of 4 samples per meter. Therefore, the GPU 108 may determine that the highest image resolution is 4 samples per meter and may upsample each tile of the tiled image region to 4 samples per meter. The GPU 108 may upsample each tile by adding the average value of all sequential pixel pairs in one dimension and repeating the process for the other dimension. For example, the GPU 108 may average the value of a first pixel and a second pixel in a u dimension to generate a first upsampled pixel and place the first upsampled pixel between the first pixel and the second pixel. Further, the GPU 108 can average the value of the second pixel and a third pixel in the u dimension to generate a second upsampled pixel and place the second upsampled pixel between the second pixel and the third pixel.

At (6), the GPU 108 can process the continuous image region 118. Based on generating the continuous image region 118, the GPU 108 can perform the processing operation defined by the user input on the continuous image region 118. The GPU 108 may further perform the processing operation on the continuous image region 118 in a single pass. For example, the GPU 108 may apply a blur effect to the continuous image region 118 in a single pass. The GPU 108 may be able to apply the processing operation in a single pass as the continuous image region 118 corresponds to a single image (e.g., the continuous image region 118 is not tiled) thereby increasing the efficiency of the processing operation and reducing the workload for the GPU 108.

At (7), the GPU 108 can generate the updated tiled image 110B. The GPU 108 may generate the updated tiled image 110B by uploading the processed continuous image region to the original tiled image 110. The GPU 108 may utilize the lookup texture 116 and the texture array 114 to determine a position of each pixel of the processed continuous image region within the original tiled image 110. Based on this determination, the GPU 108 can upload the processed continuous image region to the original tiled image 110A to generate an updated tiled image 110B. In some embodiments, the GPU 108 may upsample the tiles to generate the continuous image region 118 and, in order to generate the updated tiled image 110B, the GPU 108 may downsample the processed continuous image region. The GPU 108 may downsample the processed continuous image region by removing the even pixels in each dimension (e.g., the upsampled pixels added as a result of the upsampling of the tiled image region 112). In some embodiments, the GPU 108 may provide the processed continuous image region to the CPU 107. Further, the CPU 107 may generate the updated tiled image 110B by uploading the processed continuous image region to the original tiled image 110. For example, the CPU may upload the processed continuous image region to the original tiled image 110 on a tile-by-tile basis. The GPU 108 or the CPU 107 may generate the updated tiled image 110B using the processed continuous image region. Therefore, the GPU 108 may utilize downsampling in order to recapture the original image resolution of each tile within the plurality of tiles.

At (8), the GPU 108 can display the updated tiled image 110B. In order to display the updated tiled image 110B, the GPU 108 may transmit the updated image to a developer computing device and cause the developer computing device to display the updated image. In some embodiments, the developer computing device may request further processing operations to be performed on the updated image. Further, the GPU 108 may store the updated tiled image 110B as game data in a database in communication with a game server for display of the virtual environment.

6.0 Updating a Tiled Image Region of an Image

Figure 5:
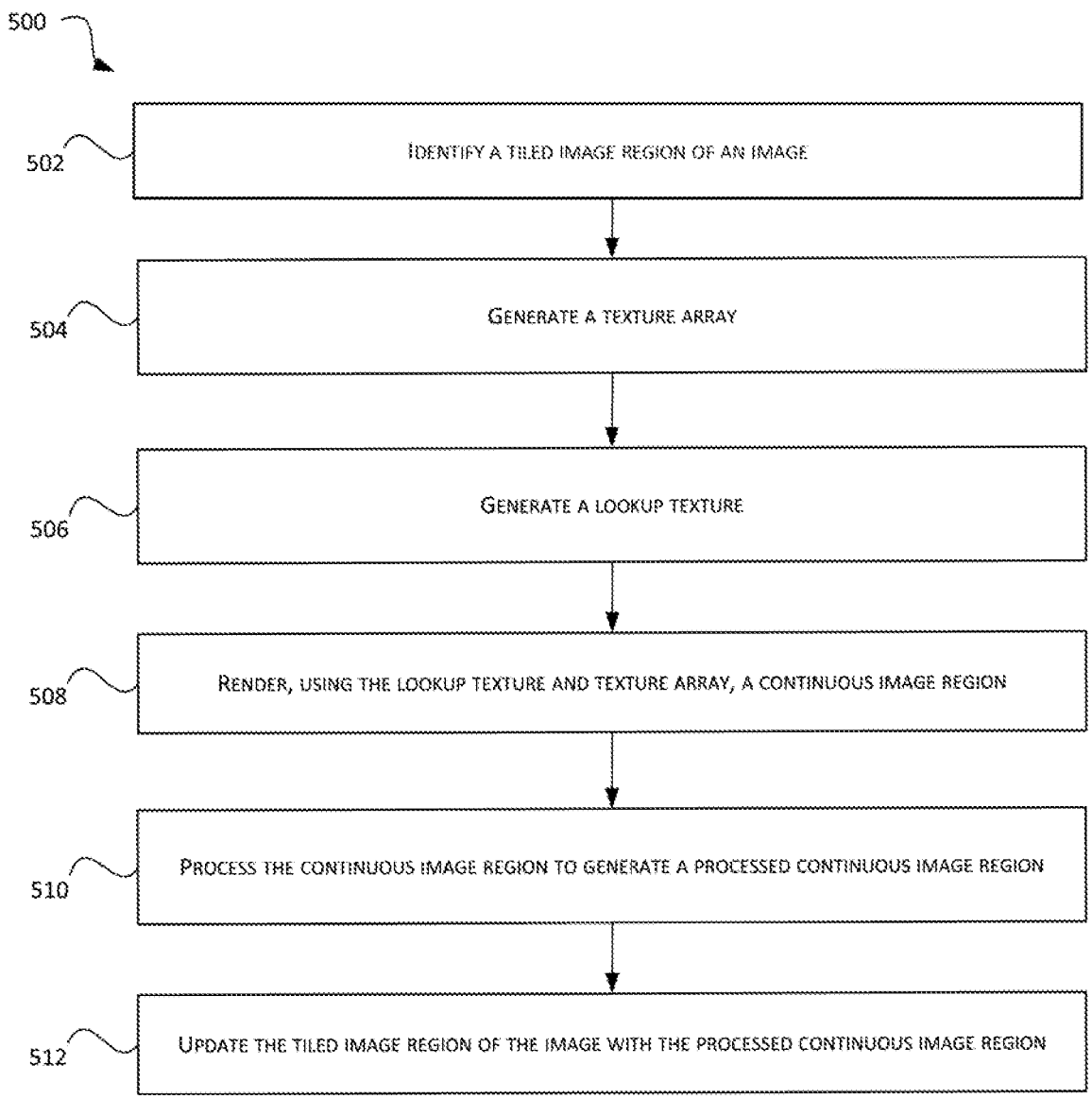
FIG. 5 illustrates an example flowchart for a method for updating a tiled image region based on one or more processing operations.

FIG. 5 illustrates an embodiment of an example flowchart for a process 500 for updating an image by applying a processing operation to a portion of the image (e.g., a tiled image region). The process 500 can be implemented by any system that can load and/or initiate a system for rendering a continuous image region from the tiled image region and applying the processing operation to the continuous image region. For example, the process 500, in whole or in part, can be implemented by a GPU of a computing device or any other computing system. The GPU may execute a game development application for development of a game application. For example, the GPU may execute the game development application for generating terrain data of a three dimensional terrain that includes a plurality of images. Each of the plurality of images may be divided into a plurality of tiles The GPU may further include one or more GPU processors. Although any number of systems, in whole or in part, can implement the process 500, to simplify discussion, the process 500 will be described with respect to particular systems. Further, although embodiments of the process 500 may be performed with respect to variations of systems comprising various game application environments, to simplify discussion, the process 500 will be described with respect to a particular interactive computing system.

In some embodiments, the GPU can identify a tiled image region of an image at 502. The GPU may identify the tiled image region from a three dimensional terrain for display within a game environment of the game application. Further, the GPU may identify the tiled image region from terrain data (e.g., data identifying or defining the three dimensional terrain). The tiled image region may further be divided into a plurality of tiles that include a plurality of image data. For example, the plurality of image data may include a plurality of raster data. In some embodiments, each tile of the plurality of tiles may be associated with an odd number of pixels in each dimension. Further, the plurality of tiles may be aligned with a quadtree layout (e.g., a quadtree layout specified by a user). The GPU may identify the tiled image region based on obtaining a request to update the tiled image region based on a processing operation. For example, the GPU may obtain the request to update the tiled image region from a developer computing device. Further, the GPU may identify the three dimensional terrain and obtain input that defines a processing operation and a tiled image region of the three dimensional terrain. In some embodiments, the tiled image region may be associated with a plurality of image resolutions. Therefore, the GPU can identify the tiled image region from the image.

In some embodiments, the GPU can generate the texture array at 504. The texture array may be associated with a plurality of coordinates (e.g., a plurality of u, v coordinates) that each identify a position of a particular tile within the tiled image region. For example, a first set of coordinates may identify a position of a first tile (or a portion of a first tile) within the tiled image region. Further, the texture array may include a coordinated system to identify the plurality of tiles. The plurality of coordinates may identify the plurality of tiles. In some embodiments, the GPU may store the texture array and/or a lookup texture in corresponding memory. Therefore, the GPU can generate the texture array based on the tiled image region.

In some embodiments, the GPU can generate the lookup texture at 506. The lookup texture may identify a corresponding tile index in the texture array of each tile of the plurality of tiles within the tiled image region. In some embodiments, the lookup texture may be a pointer. The lookup texture may further identify one or more image resolutions associated with the plurality of tiles. In some embodiments, the GPU may also generate a scaling factor that identifies a texture position within a particular tile of the plurality of tiles for each pixel of the plurality of pixels for a continuous image region. Therefore, the GPU can generate the lookup texture based on the tiled image region.

In some embodiments, the GPU can render, using the lookup texture and the texture array, a continuous image region at 508. The continuous image region may include a plurality of pixels that each correspond to a particular position with a particular tile of the plurality of tiles. The GPU may use the lookup texture to identify the tile index in the texture array of each pixel within a corresponding tile. Further, the GPU may also use the scaling factor to identify the position of each pixel within a corresponding tile. In some embodiments, the continuous image region may be associated with a uniform image resolution. Further, in order to generate the continuous image region, the GPU may upsample one or more tiles of the plurality of tiles prior to rendering the continuous image region. Therefore, the GPU can utilize the lookup texture and the texture array to render the continuous image region.

In some embodiments, the GPU can process the continuous image region to generate a processed continuous image region at 510. The GPU can process the continuous image region based on a processing operation. The processing operation may include a request to add image data to the plurality of image data, delete image data from the plurality of image data, and/or modify image data of the plurality of image data. Therefore, the GPU can generate the processed continuous image region by applying a processing operation to the continuous image region.

In some embodiments, the GPU can updated the tiled image region of the image with the processed continuous image region at 512. The GPU can further update the tiled image region within the three dimensional terrain for display within the game environment of the game application. Further, the GPU may update the tiled image region within the terrain data. In some embodiments, prior to updating the tiled image region or as part of updating the tiled image region, the GPU can downsample a portion of the continuous image region corresponding to one or more tiles in order to recapture the image resolutions associated with the tiled image region. Therefore, the GPU can update the tiled image region using the processed continuous image region.

7.0 Overview of Computing Device

Figure 6:
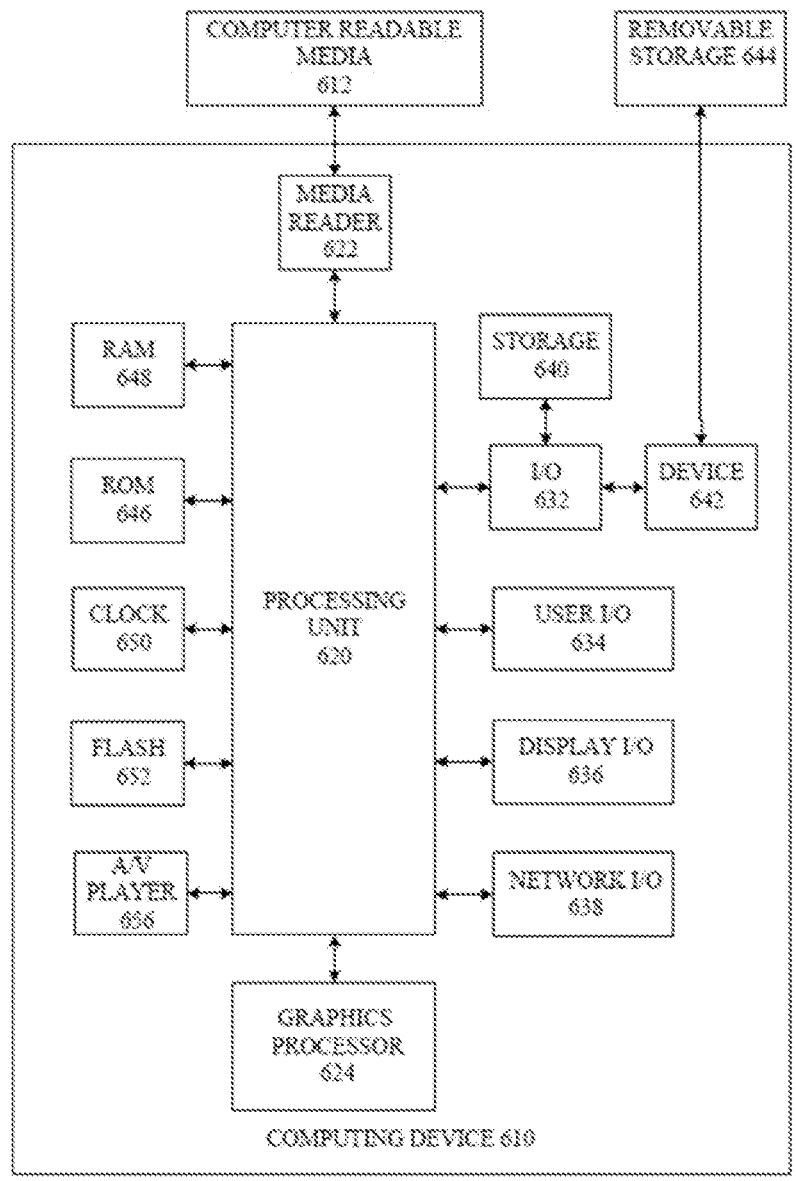
FIG. 6 illustrates an embodiment of a computing device.

FIG. 6 illustrates an embodiment of computing device 610 according to the present disclosure. Other variations of the computing device 610 may be substituted for the examples explicitly presented herein, such as removing or adding components to the computing device 106. The computing device 610 may include a game device, a smart phone, a tablet, a personal computer, a laptop, a smart television, a car console display, a server, and the like. As shown, the computing device 610 includes a processing unit 620 that interacts with other components of the computing device 610 and also external components to computing device 610. A media reader 622 is included that communicates with media 612. The media reader 622 may be an optical disc reader capable of reading optical discs, such as CD-ROM or DVDs, or any other type of reader that can receive and read data from game media 612. One or more of the computing devices may be used to implement one or more of the systems disclosed herein.

Computing device 610 may include a separate graphics processor 624. In some cases, the graphics processor 624 may be built into the processing unit 620. In some such cases, the graphics processor 624 may share Random Access Memory (RAM) with the processing unit 620. Alternatively, or in addition, the computing device 610 may include a discrete graphics processor 624 that is separate from the processing unit 620. In some such cases, the graphics processor 624 may have separate RAM from the processing unit 620. Computing device 610 might be a handheld video game device, a dedicated game console computing system, a general-purpose laptop or desktop computer, a smart phone, a tablet, a car console, or other suitable system.

Computing device 610 also includes various components for enabling input/output, such as an I/O 632, a user I/O 634, a display I/O 636, and a network I/O 638. I/O 632 interacts with storage element 640 and, through a device 642, removable storage media 644 in order to provide storage for computing device 610. Processing unit 620 can communicate through I/O 632 to store data, such as game state data and any shared data files. In addition to storage 640 and removable storage media 644, computing device 610 is also shown including ROM (Read-Only Memory) 646 and RAM 648. RAM 648 may be used for data that is accessed frequently, such as when a game is being played or the fraud detection is performed.

User I/O 634 is used to send and receive commands between processing unit 620 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 636 provides input/output functions that are used to display images from the game being played. Network I/O 638 is used for input/output functions for a network. Network I/O 638 may be used during execution of a game, such as when a game is being played online or being accessed online and/or application of fraud detection, and/or generation of a fraud detection model.

Display output signals produced by display I/O 636 comprising signals for displaying visual content produced by computing device 610 on a display device, such as graphics, user interfaces, video, and/or other visual content. Computing device 610 may comprise one or more integrated displays configured to receive display output signals produced by display I/O 636. According to some embodiments, display output signals produced by display I/O 636 may also be output to one or more display devices external to computing device 610, such a display 616.

The computing device 610 can also include other features that may be used with a game, such as a clock 650, flash memory 652, and other components. An audio/video player 656 might also be used to play a video sequence, such as a movie. It should be understood that other components may be provided in computing device 610 and that a person skilled in the art will appreciate other variations of computing device 610.

Program code can be stored in ROM 646, RAM 648 or storage 640 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 640, and/or on removable media such as game media 612 (which can be a CD-ROM, cartridge, memory chip or the like, or obtained over a network or other electronic channel as needed). In general, program code can be found embodied in a tangible non-transitory signal-bearing medium.

Random access memory (RAM) 648 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 648 is volatile storage and data stored within RAM 648 may be lost when the computing device 610 is turned off or loses power.

As computing device 610 reads media 612 and provides an application, information may be read from game media 612 and stored in a memory device, such as RAM 648. Additionally, data from storage 640, ROM 646, servers accessed via a network (not shown), or removable storage media 646 may be read and loaded into RAM 648. Although data is described as being found in RAM 648, it will be understood that data does not have to be stored in RAM 648 and may be stored in other memory accessible to processing unit 620 or distributed among several media, such as media 612 and storage 640.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A system comprising:
   one or more processors; and
   a computer-readable storage medium including machine-readable instructions that, when executed by the one or more processors, cause the one or more processors to execute a game development application for generating terrain data for a terrain, the terrain comprising an image divided into a plurality of tiles, the game development application configured to:
   receive input at a user interface of the game development application, the input identifying at least a portion of multiple tiles of the plurality of tiles and a processing operation associated with the at least a portion of the multiple tiles, wherein the at least a portion of the multiple tiles are configured for display based on image data of the image;
   generate a texture array;

generate a lookup texture, wherein the lookup texture identifies a corresponding tile index in the texture array of each tile of the at least a portion of the multiple tiles;

render, using the lookup texture and the texture array, a continuous image region corresponding to the at least a portion of the multiple tiles and comprising a plurality of pixels, each pixel of the plurality of pixels corresponding to a respective position within a respective tile of the at least a portion of the multiple tiles, wherein the respective position is identified using the lookup texture;

process the continuous image region corresponding to the at least a portion of the multiple tiles based on the processing operation associated with the at least a portion of the multiple tiles to generate a processed continuous image region; and upload the processed continuous image region to the at least a portion of the multiple tiles for display within the game development application to update the at least a portion of the multiple tiles according to the processing operation associated with the at least a portion of the multiple tiles.

2. The system of claim 1, wherein the processing operation associated with the at least a portion of the multiple tiles comprises a request to:

add image data to the image data of the image, delete image data from the image data of the image, or modify image data of the image data of the image.

3. The system of claim 1, wherein the game development application is further configured to obtain a request to update the at least a portion of the multiple tiles based on the processing operation associated with the at least a portion of the multiple tiles.

4. The system of claim 1, wherein the game development application is further configured to identify the terrain and the at least a portion of the multiple tiles based on the input.

5. The system of claim 1, wherein the lookup texture further identifies one or more image resolutions associated with the at least a portion of the multiple tiles.

6. The system of claim 1, wherein the game development application is further configured to identify a scaling factor, wherein the scaling factor identifies a texture position within a particular tile of the at least a portion of the multiple tiles for each pixel of the plurality of pixels, wherein the respective position is further identified using the scaling factor.

7. The system of claim 1, wherein the one or more processors comprise one or more graphical processing unit processors.

8. The system of claim 1, wherein the at least a portion of the multiple tiles is associated with a plurality of image resolutions, wherein the continuous image region corresponding to the at least a portion of the multiple tiles is associated with a uniform image resolution.

9. The system of claim 1, wherein the game development application is further configured to:

upsample one or more tiles of the at least a portion of the multiple tiles prior to rendering the continuous image region corresponding to the at least a portion of the multiple tiles; and downsample a portion of the continuous image region corresponding to the at least a portion of the multiple tiles and the one or more tiles to generate a downsampled portion of the continuous image region corresponding to the at least a portion of the multiple tiles prior to uploading the processed continuous image region to the at least a portion of the multiple tiles, wherein the processed continuous image region comprises the downsampled portion of the continuous image region corresponding to the at least a portion of the multiple tiles.

10. The system of claim 1, wherein the at least a portion of the multiple tiles are aligned with a quadtree layout, wherein the quadtree layout is specified by a user.

11. The system of claim 1, wherein the terrain further comprises a plurality of images, each of the plurality of images divided into a corresponding plurality of tiles, wherein the plurality of images comprise the image.

12. The system of claim 1, further comprising memory, wherein the memory stores the texture array and the lookup texture.

13. The system of claim 1, wherein the image data comprises raster data.

14. The system of claim 1, wherein the one or more processors comprise one or more graphical processing unit processors, wherein the game development application is further configured to obtain the image from one or more central processing unit processors.

15. The system of claim 1, wherein the texture array is associated with a plurality of uv coordinates, wherein the plurality of uv coordinates identify a respective position of each tile of the at least a portion of the multiple tiles, wherein, to identify the respective position, the game development application is further configured to determine uv coordinates for each tile of the at least a portion of the multiple tiles.

16. A computer-implemented method comprising:

as implemented by an interactive computing system configured with specific computer-executable instructions during runtime of a game development application for generating terrain data of a terrain, the terrain comprising an image divided into a plurality of tiles, receiving input at a user interface of the game development application, the input identifying at least a portion of multiple tiles of the plurality of tiles and a processing operation associated with the at least a portion of the multiple tiles, wherein the at least a portion of the multiple tiles are configured for display based on image data of the image;

generating a texture array;

generating a lookup texture, wherein the lookup texture identifies a corresponding tile index in the texture array of each tile of the at least a portion of the multiple tiles;

rendering, using the lookup texture and the texture array, a continuous image region corresponding to the at least a portion of the multiple tiles and comprising a plurality of pixels, each pixel of the plurality of pixels corresponding to a respective position within a respective tile of the at least a portion of the multiple tiles, wherein the respective position is identified using the lookup texture;

processing the continuous image region corresponding to the at least a portion of the multiple tiles based on the processing operation associated with the at least a portion of the multiple tiles to generate a processed continuous image region; and uploading the processed continuous image region to the at least a portion of the multiple tiles for display within the game development application to update the at least a portion of the multiple tiles according to the processing operation associated with the at least a portion of the multiple tiles.

17. The computer-implemented method of claim 16, further comprising identifying the terrain and the at least a portion of the multiple tiles based on the input.

18. The computer-implemented method of claim 16, further comprising:
upsampling one or more tiles of the at least a portion of the multiple tiles prior to rendering the continuous image region corresponding to the at least a portion of the multiple tiles; and
downsampling a portion of the continuous image region corresponding to the at least a portion of the multiple tiles and the one or more tiles to generate a downsampled portion of the continuous image region corresponding to the at least a portion of the multiple tiles prior to uploading the processed continuous image region to the at least a portion of the multiple tiles, wherein the processed continuous image region comprises the downsampled portion of the continuous image region corresponding to the at least a portion of the multiple tiles.

19. A non-transitory computer-readable medium storing computer-executable instructions that, when executed by one or more computing devices, configure the one or more computing devices to execute a game development application for generating terrain data of a terrain, the terrain comprising an image divided into a plurality of tiles, the game development application configured to:
receive input at a user interface of the game development application, the input identifying at least a portion of multiple tiles of the plurality of tiles and a processing operation associated with the at least a portion of the multiple tiles;
generate a texture array;
generate a lookup texture, wherein the lookup texture identifies a corresponding tile index in the texture array of each tile of the at least a portion of the multiple tiles;
render, using the lookup texture and the texture array, a continuous image region corresponding to the at least a portion of the multiple tiles and comprising a plurality of pixels, each pixel of the plurality of pixels corresponding to a respective position within a respective tile of the at least a portion of the multiple tiles, wherein the respective position is identified using the lookup texture;
process the continuous image region corresponding to the at least a portion of the multiple tiles based on the processing operation associated with the at least a portion of the multiple tiles to generate a processed continuous image region; and
upload the processed continuous image region to the at least a portion of the multiple tiles for display within the game development application to update the at least a portion of the multiple tiles according to the processing operation associated with the at least a portion of the multiple tiles.

20. The non-transitory computer-readable medium of claim 19, wherein the game development application is further configured to:
upsample one or more tiles of the at least a portion of the multiple tiles prior to rendering the continuous image region corresponding to the at least a portion of the multiple tiles; and
downsample a portion of the continuous image region corresponding to the at least a portion of the multiple tiles and the one or more tiles to generate a downsampled portion of the continuous image region corresponding to the at least a portion of the multiple tiles prior to uploading the processed continuous image region to the at least a portion of the multiple tiles, wherein the processed continuous image region comprises the downsampled portion of the continuous image region corresponding to the at least a portion of the multiple tiles.

* * * * *